United States Patent
Sakuma et al.

(10) Patent No.: US 6,431,640 B1
(45) Date of Patent: Aug. 13, 2002

(54) ASSIST GRIP

(75) Inventors: Yoshiyuki Sakuma; Takashi Hosokawa; Chiharu Totani; Hiroyuki Tajima; Hiroshi Kondo; Shigeru Yabuya, all of Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/927,354

(22) Filed: Aug. 13, 2001

(30) Foreign Application Priority Data

Aug. 11, 2000 (JP) ........................................ 2000-243907
Aug. 30, 2000 (JP) ........................................ 2000-260710

(51) Int. Cl.$^7$ ................................................. B60J 7/00
(52) U.S. Cl. ........................ 296/189; 296/210; 280/748
(58) Field of Search ........................... 296/189, 210, 296/203.03, 214; 280/748, 728.2, 730.2; 188/371; 16/408; 411/45, 60

(56) References Cited

U.S. PATENT DOCUMENTS 5,855,408 A * 1/1999 Rickabus ................ 296/214 X
5,975,606 A * 11/1999 Forbes et al. ........... 296/214 X
6,042,176 A * 3/2000 Ikeda et al. ............. 280/748 X

FOREIGN PATENT DOCUMENTS

| DE | 19747704 A1 | * 5/1999 |
| JP | 9-66764 | 3/1997 |
| JP | 410291458 A | * 11/1998 |
| JP | 2001-39196 | 2/2001 |
| JP | 2001-97103 | 4/2001 |

* cited by examiner

Primary Examiner—Joseph D. Pape
Assistant Examiner—Jason Morrow
(74) Attorney, Agent, or Firm—Pillsbury Winthrop LLP (57) ABSTRACT

A shock absorbing portion is pivotally supported on a grip body and is fixed to a vehicle body steel plate. A claw portions are protruded inwardly from a first and second side surface portions of a cover for covering a bridge portion so as to be inclined toward a bottom portion at an acute angle with respect to a normal respectively, and are engaged with engagement holes of the bridge portion and are held and fixed thereto respectively, and the cover is fixed to the bridge portion such that an opening faces opposite to a vehicle compartment.

7 Claims, 6 Drawing Sheets

STRESS APPLIED FROM AIR BAG

ASSIST GRIP

CROSS REFERENCE TO THE RELATED APPLICATIONS

The present application is based on Japanese Patent Applications No. 2000-243907 and No. 2000-260710 which are incorporated herein by reference.

BACKGROUND OF THE INVENTION

1. Field of the Invention

The present invention relates to an assist grip to be swingably attached to a ceiling panel of a vehicle, and more particularly to an assist grip capable of reducing an assembly man-hour.

Further, the present invention relates to an assist grip to be swingably attached to a ceiling panel of a vehicle, and more particularly to an assist grip which is suitable for a vehicle having a curtain shield air bag.

2. Description of the Related Art

In order to support an occupant's body of a vehicle, an assist grip is provided in the vicinity of the upper part of a side window over a ceiling panel of a passenger car. The assist grip generally comprises an U-shaped grip body and a-mounting seat provided on both ends of the grip body, and the mounting seat is fixed to the vehicle body through the ceiling panel and is thus used. In recent years, moreover, the grip body is rotatably supported on the mounting seat. According to such an assist grip, the grip body can be stored along the ceiling panel during nonuse and can be prevented from being protruded toward a vehicle compartment. Therefore, an appearance in the vehicle compartment can be enhanced and the vehicle compartment can be used widely.

Further, there is also provided a shock absorbing member for absorbing a shock by deformation when a human body collides with the assist grip by great force. The shock absorbing member is formed of an almost cylindrical metallic member and is fixed to the vehicle body through welding. The mounting seat of the assist grip is fixed to the shock absorbing member through bolt fastening so that a shock acting on the assist grip can be absorbed.

However, when the conventional assist grip is to be fixed to the vehicle body, the shock absorbing member is to be first fixed to the vehicle body in advance and the mounting seat is to be fixed to the shock absorbing member through the bolt fastening. For this reason, an automobile assembling line requires two works of a step of welding the shock absorbing member and a step of assembling the assist grip. Moreover, the number of parts is large and a device and a space for carrying out a welding work are required. Thus, a man-hour is increased.

In the assist grip in which the grip body is rotatably supported on the mounting seat, moreover, a spring is provided on a pivotal shaft and the grip body is energized in a direction of the ceiling panel through the spring in many cases. Consequently, the grip body can be always positioned along the ceiling panel during nonuse.

Further, in many cases, the assist grip includes a damper for preventing the grip body from being quickly swung by the energizing force of the spring and colliding with the ceiling panel and suppressing the generation of a collision sound.

In the case in which the assist grip thus energized by the spring is to be fixed to the vehicle body, however, the grip body is an obstacle during the bolt fastening. Therefore, it is necessary to fasten a bolt with the grip body swung and held against the energizing force of the spring. On other words, the grip body is to be swung and held by one of operator's hands and the bolt is to be fastened by the other hand. Therefore, there is a problem in that the assembling work is carried out with difficulty in a small working space such as a vehicle compartment.

The spring and the damper are generally provided in the vicinity of a pivotal support shaft of the mounting seat. In that case, however, the spring and the damper are provided so that the size of the mounting seat is increased. Consequently, the assist grip has a comparatively large size, which is not preferable in respect of a design or an appearance in a vehicle compartment.

It is proposed that a bridge portion formed of a synthetic resin for coupling the mounting seats on both ends is provided and the spring and the damper are accommodated in the bridge portion. Consequently, the size of the mounting seat can be reduced and the bridge portion to be newly added has a comparative small volume. Therefore, the design can be improved and the appearance in the vehicle compartment can also be enhanced. Moreover, the stability of an operation can also be enhanced.

In recent years, some automobiles have a curtain shield air bag provided in the upper part of a side window in order to enhance safety during a side collision. However, in the case in which the curtain shield air bag expands into the vehicle compartment, a stress also acts on the assist grip. In the assist grip having the bridge portion, therefore, it is particularly necessary to take a countermeasure against the air bag in the bridge portion. In other words, it is necessary to prevent the bridge portion from being broken by the stress and to prevent fragments from being scattered.

Accordingly, it is preferable that the bridge portion should be formed of a metal. If the bridge portion is formed of a metal, the stress applied from the air bag is absorbed by the deformation of the bridge portion. Therefore, the bridge portion is not broken and fragments are not scattered.

On the other hands since the bridge portion is exposed into the vehicle compartment, the bridge portion formed of a metal is not preferable for the design. It is proposed that the bridge portion is covered with a cover having a design surface. In the case in which the cover is to be thus put, it is usually formed to have an U-shaped section and is generally provided to cover the bridge portion such that the open side is opposed to the ceiling panel and a bottom portion thereof is exposed to the vehicle compartment side. In this case, however, a shock applied from the air bag acts on the cover from the open side. Therefore, force in a direction of removal from the bridge portion acts on the cover. Accordingly, it is necessary to firmly fix the cover to the bridge portion in order to reliably prevent the cover from being separated from the bridge portion.

However, the bond of the cover and the bridge portion increases a man-hour and deteriorates maintenance. Therefore, it is desirable that the bridge portion should be covered with the cover through only mechanical engagement. In consideration of an assembling workability, moreover, it is desirable that the cover should be assembled easily into the bridge portion.

SUMMARY OF THE INVENTION

The invention has been made in consideration of such circumstances and has an object to provide an assist grip which can decrease the number of parts, does not require a step of welding a shock absorbing member and can reduce an assembly man-hour.

In addition, the invention has an object to provide such a structure that a cover is not separated from a bridge portion even if a shock is applied from an air bag and the cover can easily be assembled into the bridge portion in an assist grip having the bridge portion.

In order to solve the problems described above, the invention provides an assist grip comprising a grip body and a shock absorbing portion swingably supported on at least one of ends of the grip body, the shock absorbing portion being fixed to a vehicle body, wherein the mounting seat is constituted by a pivotal support portion rotatably supported on the grip body and a buckling portion which is extended integrally from the pivotal support portion and is deformed by a shock, thereby absorbing the shock, the shock absorbing portion being fixed to the vehicle body.

It is desirable that one of ends of a cap for covering the shock absorbing portion should be pivotally supported on the shock absorbing portion and the other end of the cap should be provided with an engagement portion for swinging the shock absorbing portion to expose the shock absorbing portion and for swinging the cap in the same state to be engaged with the grip body, thereby controlling the swinging motion of the shock absorbing portion in such a direction as to approach the grip body.

In an assist grip according to the invention, a shock absorbing portion has a pivotal support portion rotatably supported pivotally on a grip body and a buckling portion which is extended integrally from the pivotal support portion and is deformed by a shock, thereby absorbing the shock, and the shock absorbing portion is fixed to a vehicle body. In other words, the shock absorbing portion also serves as the mounting seat. Accordingly, it is not necessary to previously provide the shock absorbing member on the vehicle body, the shock absorbing member does not need to be welded and the number of parts is decreased. Therefore, it is possible to greatly reduce a man-hour in an assembling step of an automobile.

Although the shock absorbing portion can be formed of various materials if it has such a strength as to be resistant to normal use, it should have such a strength as to be resistant to bolt fastening. Therefore, it is desirable that the shock absorbing portion should be formed of a metal. Moreover, it is particularly preferable that the shock absorbing member should be formed of a metal because it is not broken during expansion of a curtain shield air bag.

The mounting seat is swingably supported on at least one of ends of a grip body. It is preferable that the mounting seat should be provided on both ends of the grip body. In the case in which the mounting seat is provided on both ends of the grip body, the pivotal support portion of the mounting seat may be individually provided on the respective mounting seats or one pivotal support portion can also support both mounting seats swingably and pivotally. The pivotal support portion can be formed of various materials which are resistant to a stress during use. However, in some cases in which one pivotal support portion formed of a synthetic resin swingably and pivotally supports both mounting seats like a bridge, it is broken at the time of expansion of a curtain shield air bag. Therefore, it is desirable that the pivotal support portion should also be formed of a metal. If the pivotal support portion is formed of a metal, it can absorb a shock applied from the air bag by its own deformation. Therefore, there is no possibility that the pivotal support portion might be broken.

In an assist grip in which a grip body is rotatably supported on a mounting seat, a shock absorbing portion is visually recognized when the grip body is swung. Therefore, there is a problem in that an appearance is poor. For this reason, it is desirable that the mounting seat should be provided with a cap for covering the shock absorbing portion. The cap can engage another member with the mounting seat to be held and can also be supported pivotally on the pivotal support portion so as to be swingable.

In addition, according to the invention, the cap is provided between the grip body and the mounting seat, thereby controlling the swinging motion of the grip body in such a direction as to approach the mounting seat by the energizing force of the spring. More specifically, one of ends of the cap is pivotally supported on the mounting seat and the cap is swung in such a state that the mounting seat is swung to expose the shock absorbing portion. Thus, the other end of the cap is engaged with the grip body. Consequently, since the swinging motion of the grip body is controlled by the cap, the shock absorbing portion maintains the state of exposure so that the fixation can easily be carried out with a bolt.

In order to cause the end of the cap to be engaged with the grip body, an engagement portion may be provided on the grip body or a concave portion for accommodating the cap of the grip body can also be engaged with the tip of the cap. In the latter case, it might be necessary to deform the cap. In this case, it is desirable that the cap should be formed of a soft synthetic resin such as thermoplastic elastomer or rubber. Consequently, the cap is deformed easily. Therefore, the engagement with the grip body can easily be carried out.

The second aspect of the invention provides an assist grip for an automobile comprising a grip body, a mounting seat swingably supported on both ends of the grip body, a bridge portion formed of a metal which serves to couple the mounting seats provided on both ends, and a cover formed of a synthetic resin which serves to cover the bridge portion, wherein the cover has an U-shaped section including a first side surface portion having a greater length on a section perpendicular to a longitudinal direction, a second side surface portion which is opposed to the first side surface portion at an interval and has a smaller length on the section than that of the first side surface portion, and a bottom portion for coupling the first side surface portion to the second side surface portion, a plurality of claw portions are protruded inwardly from the first side surface portion and the second side surface portion so as to be inclined toward the bottom portion at an acute angle with respect to a normal respectively, the claw portions are engaged with a plurality of engagement holes provided in the bridge portion and are held and fixed thereto respectively, and the cover is fixed to the bridge portion such that an opening faces opposite to a vehicle compartment.

In the above assist grip, it is desirable that the claw portion provided in the first side surface portion should have a greater length than that of the claw portion provided in the second side surface portion. Moreover, it is desirable that a part of the cover should be provided with a small diameter portion having a smaller whole length on a section perpendicular to a longitudinal direction than a whole length on sections of the first side surface portion, the bottom portion and the second side surface portion.

In an assist grip according to the invention, a plurality of claw portions are protruded inwardly from a first side surface portion and a second side surface portion in a cover so as to be inclined toward a bottom portion at an acute angle with respect to a normal and are engaged with a plurality of engagement holes provided on a bridge portion respectively, and the cover is held and fixed into the bridge portion such that an opening faces opposite to a vehicle compartment. On the other hand, a direction of a stress applied when a curtain shield air bag expands is equivalent to a direction from a ceiling panel toward the vehicle compartment, that is, a direction from the opening of the cover to the inside of the cover. Accordingly, the direction of the stress is set to be a direction in which the claw portion is engaged with the engagement hole more deeply. Therefore, the cover can be prevented from slipping off from the bridge portion.

Moreover, the cover has an U-shaped section including a first side surface portion having a greater length on a section perpendicular to a longitudinal direction, a second side surface portion which is opposed to the first side surface portion at an interval and has a smaller length on the section than that of the first side surface portion, and a bottom portion for coupling the first side surface portion to the second side surface portion. Accordingly, when the cover is to be fixed to the bridge portion, the claw portion of the first side surface portion is first engaged with the engagement hole of the bridge portion. Since the first side surface portion has the greater length on the section, the principle of a lever acts so that the claw portion can easily be engaged with the engagement hole of the bridge portion and can readily be deformed elastically to open the opening of the cover. Accordingly, it is possible to turn the second side surface portion around the bridge portion and to engage the claw portion of the second side surface portion with the engagement hole while elastically deforming the claw portion to open the opening of the cover in such a state that the claw portion is engaged with the engagement hole. Thus, the cover can easily be fixed to the bridge portion.

At this time, if the claw portion provided on the first side surface portion is set to be longer than the claw portion of the second side surface portion, the claw portion itself of the first side surface portion engaged with the engagement hole is easily deformed elastically and the amount of the deformation is increased. Therefore, the claw portion of the second side surface portion can be engaged with the engagement hole more easily. Moreover, as the claw portion of the second side surface portion is shorter, it can be engaged with the engagement hole more easily. It is desirable that the claw portion should have such a minimum length as not to slip off due to a stress applied from an air bag.

Moreover, while the whole cover is constituted as described above, it is desirable that a part of the cover should be provided with a small diameter portion having a whole length on a section perpendicular to a longitudinal direction which is smaller than a whole length on sections of the first side surface portion, the bottom portion and the second side surface portion. The small diameter portion more increases a rigidity so that the cover slips off from the bridge portion with more difficulty. Moreover, if the small diameter portion forms a part, the residual portion is fixed to the bridge portion so that the claw portion of the small diameter portion can also be engaged with the engagement hole easily with the assistance of the rigidity of the cover. Accordingly, it is desirable that the small diameter portion should be formed in a central part where the assistance of the rigidity can be received easily.

The cover can be formed of a synthetic resin through molding. In order to easily carry out the deformation, it is desirable that the cover should be formed of a soft synthetic resin such as thermoplastic elastomer. The bridge portion is formed of a metal and couples mounting seats to each other. The shape is not particularly restricted. Moreover, it is also preferable that a shock absorbing portion for absorbing a shock energy through buckling when a great shock acts should be formed integrally with the bridge portion. The bridge portion can be provided with a spring for energizing a grip body and a damper for controlling the swinging speed of the grip body.

DETAILED DESCRIPTION OF THE PREFERRED EMBODIMENTS

First Embodiment

Figure 1:
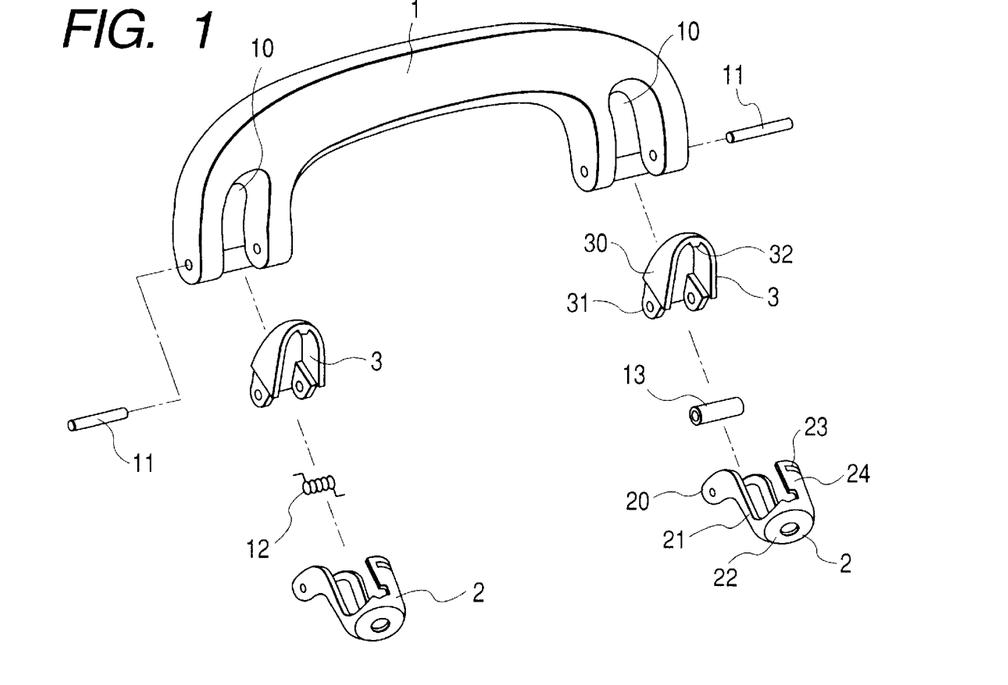
FIG. 1 is a perspective view showing the structure of a part of an assist grip according to an embodiment of the invention.

FIG. 1 shows the structure of an assist grip according to an embodiment of the invention. The assist grip is mainly constituted by an U-shaped grip body 1, a shock absorbing portion 2 swingably supported on the grip body 1, and a cap 3.

The grip body 1 has a concave portion 10 provided on both ends, and the shock absorbing portion 2 and the cap 3 are swingably supported in the concave portion 10 with a pin 11. A spring 12 is provided in one of the concave portions 10 to energize the grip body 1 and the shock absorbing portion 2 to be separated from each other. Moreover, a damper 13 is provided in the other concave portion 10.

The shock absorbing portion 2 is formed of a plate metal, and includes a pivotal support portion 20 through which the pin 11 is to be inserted, a buckling portion 21 extended from the pivotal support portion 20 and set to have a predetermined strength, a mounting portion 22 formed on the tip of the buckling portion 21 and provided with a bolt hole, and an engagement portion 24 protruding from the mounting portion 22 toward the pivotal support portion 20 side substantially in parallel with the buckling portion 21 and having an engagement hole 23 which serves to engage one of ends of the cap 3.

In the shock absorbing portion 2, the pivotal support portion 20 is swingably supported on the grip body 1 and the mounting portion 22 is fixed to a vehicle body with a bolt. In the case in which a great shock acts on the grip body 1, the buckling portion 21 buckles to absorb the shock.

The cap 3 is formed of a synthetic resin, and is constituted by a cover portion 30 for covering the shock absorbing portion 2 and a pivotal support portion 31 extended from the cover portion 30 through which the pin 11 is to be inserted. A projection 32 to be engaged with the engagement hole 23 of the shock absorbing portion 2 is protruded inwardly from the tip of the cover portion 30.

Figure 2:
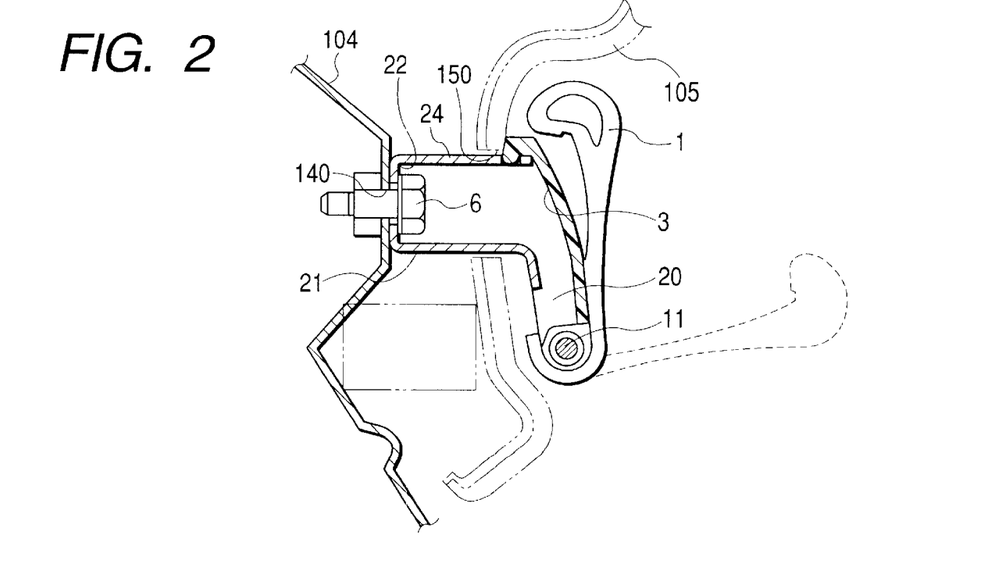
FIG. 2 is a sectional view showing a state in which the assist grip according to the embodiment of the invention is assembled into a vehicle body.

The assist grip according to the embodiment having the structure described above is fixed to the vehicle body and is thus used as shown in FIG. 2. Fixing holes 140 and 150 are previously formed on a vehicle body steel plate 104 and a ceiling panel 105. The buckling portion 21, the mounting portion 22 and the engagement portion 24 in the shock absorbing portion 2 are inserted into the fixing hole 150 and the mounting portion 22 abuts on the vehicle body steel plate 104 and is thus fixed with a bolt 6. The cover portion 30 covers the shock absorbing portion 2 and the projection 32 is engaged with the engagement hole 23 so that the cap 3 is held in the shock absorbing portion 2. The grip body 1 can be swung freely around the pin 11.

The grip body 1 is provided along the ceiling panel 105 by the energizing force of the spring 12 during nonuse, and the amount of protrusion into a vehicle compartment is small. Therefore, a good appearance can be obtained and the vehicle compartment can be used widely. During use, the grip body 1 is gripped and swung, and is thereby brought into a state shown in a dotted line of FIG. 2. Thus, the grip body 1 can be used as the assist grip.

When the grip body 1 is released after the use, the grip body 1 is swung in such a direction as to approach the ceiling panel 105 by the energizing force of the spring 12 and a speed thereof is decreased by the damper 13 so that a collision sound is reduced at the time of abutment on the cap 3 or the ceiling panel 105.

When a great shock acts on the grip body 1, the shock absorbing portion 2 absorbs the shock by the buckling operation of the buckling portion 21. Accordingly, the shock to act on a human body can be relieved.

More specifically, in the assist grip according to the embodiment, the shock absorbing portion 2 integrated with the grip body 1 is supplied to an assembling step. Accordingly, it is not necessary to previously provide the shock absorbing member on the vehicle body steel plate 104 through welding. Therefore, a welding device is not required and a working space is not necessary. Thus, a man-hour at the assembling step can be reduced greatly.

Second Embodiment

In the assist grip according to the first embodiment, it is necessary to carry out a work for swinging the grip body 1 against the energizing force of the spring 12 to open the cap 3 and for fastening the bolt 6 by one of the operator's hands while holding the same state by the other hand during fixation to the vehicle body steel plate 104. This work is carried out in a small vehicle compartment and it is hard to say that the work can be carried out easily.

Figure 3:
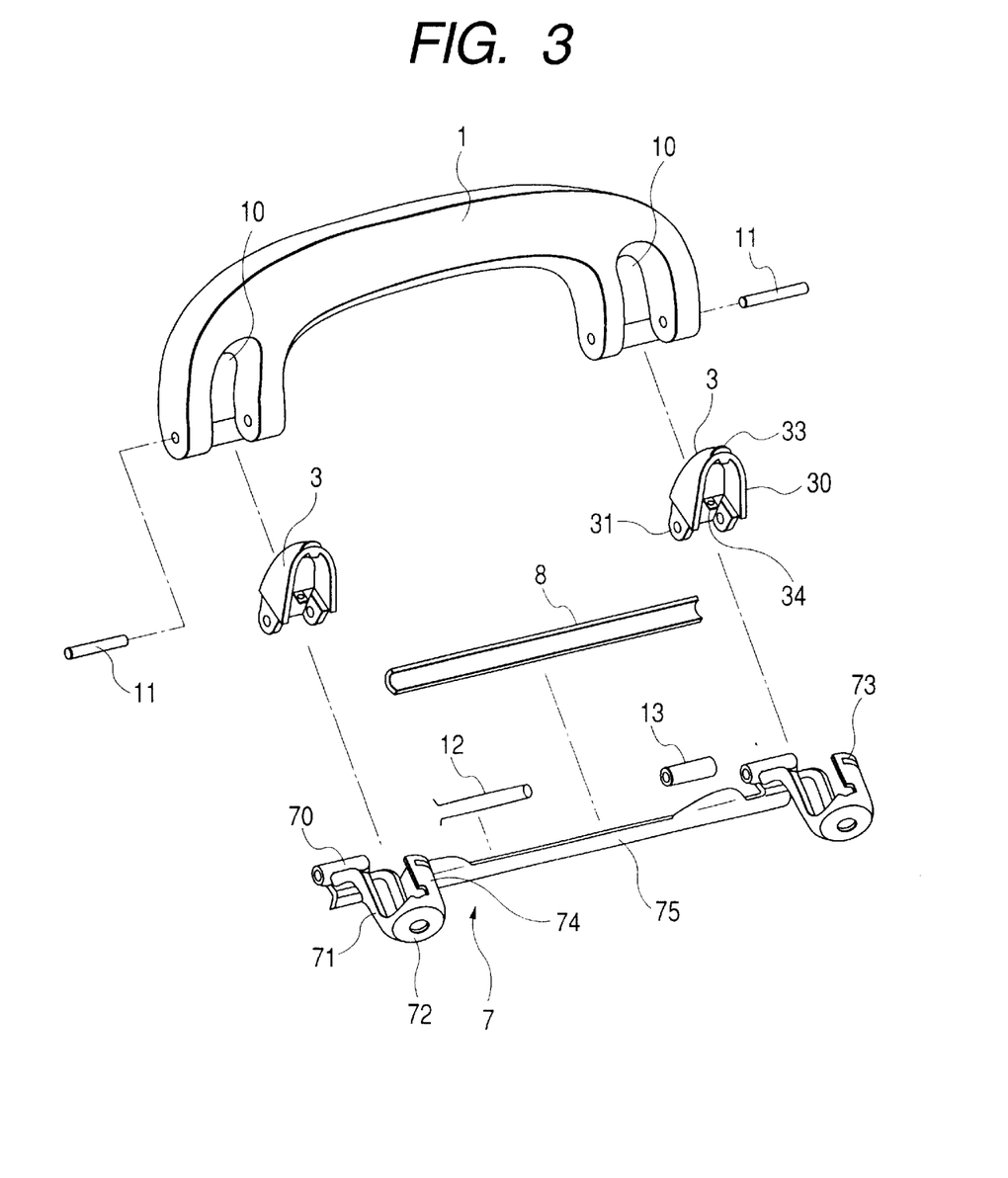
FIG. 3 is a perspective view showing the structure of a part of an assist grip according to a second embodiment of the invention.
Figure 4:
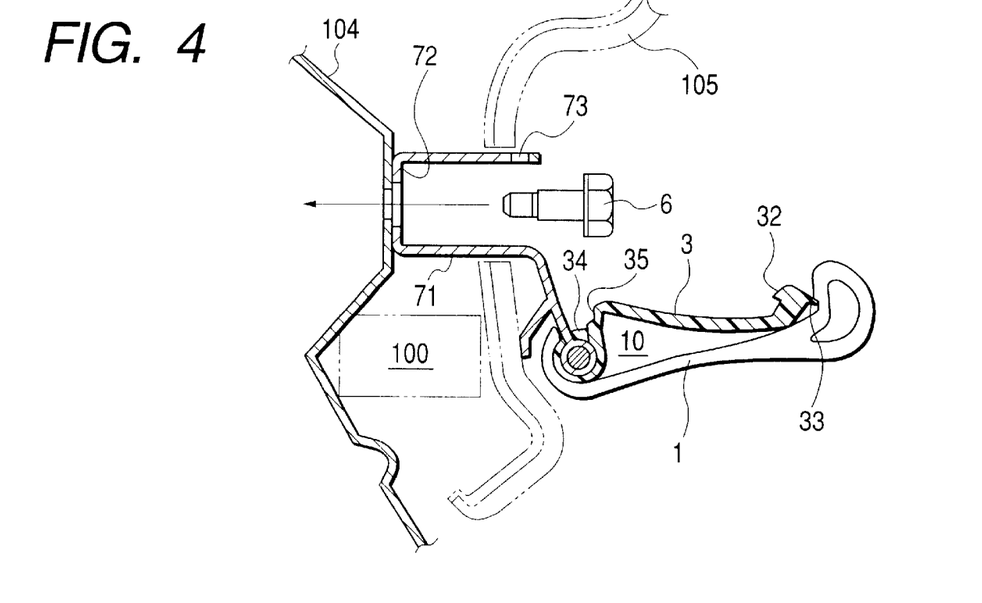
FIG. 4 is a sectional view showing a method of assembling the assist grip according to the second embodiment of the invention to a vehicle body.
Figure 5:
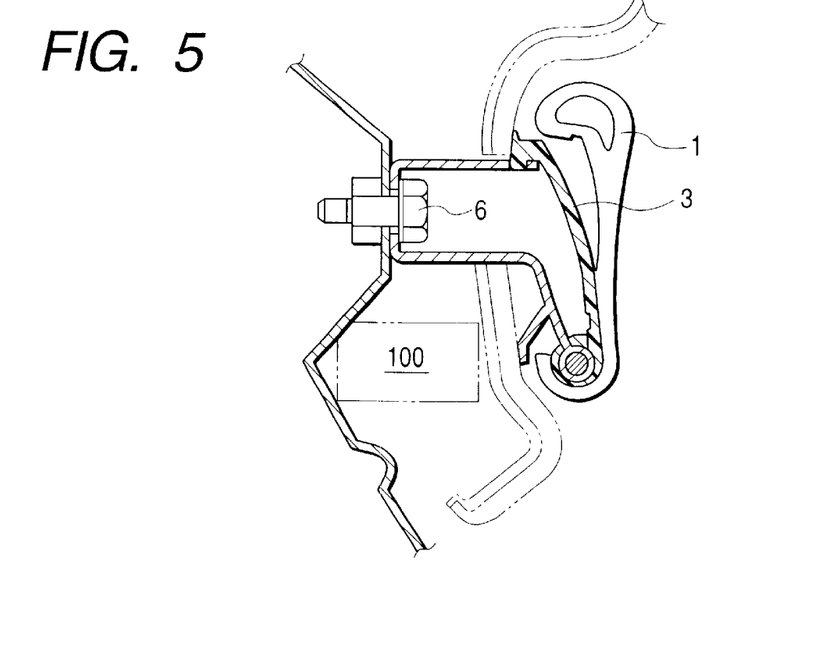
FIG. 5 is a sectional view showing a state in which the assist grip according to the second embodiment of the invention is assembled into the vehicle body.

An assist grip according to the second embodiment which can eliminate such a drawback is mainly constituted by the grip body 1, a shock absorbing portion 7 and the cap 3 as shown in FIGS. 3 to 5, similarly to the first embodiment.

The shock absorbing portion 7 is formed of a plate metal and is elongated, and both ends thereof are provided with a pivotal support portion 70 through which a pin 11 is to be inserted, a buckling portion 71 protruded from the pivotal support portion 70 toward the opposite side and set to have a predetermined strength, a mounting portion 72 formed on the tip of the buckling portion 71 and provided with a bolt hole, and an engagement portion 74 having an engagement hole 73 which is protruded from the mounting portion 72 toward the pivotal support portion 70 side substantially in parallel with the buckling portion 71 and serving to engage one of ends of the cap 3. A central portion 75 for connecting both ends has an U-shaped section. A spring 12 and a damper 13 are provided in the central portion 75 and functions in the same manner as in the first embodiment. Moreover, the central portion 75 is covered with a cover 8 formed of a synthetic resin.

The cap 3 has a first convex portion 33 (engagement portion) protruded outward from the tip of the cover portion 30 and a second convex portion 34 protruded in the vicinity of the pivotal support portion 31 in addition to the cap 3 according to the first embodiment, and a hinge portion 35 is formed as shown in FIGS. 4 and 5. The cap 3 is formed of a soft synthetic resin and can be bent through the hinge portion 35.

In the assist grip according to the second embodiment having the structure described above, as shown in FIG. 4, the grip body 1 is first swung and the cap 3 is bent through the hinge portion 35 to engage the first convex portion 33 with the top of a concave portion 10. When the grip body 1 is released in that state, the grip body 1 tries to be swung in such a direction as to approach a ceiling panel 105 by the energizing force of the spring 12. At this time, however, the first convex portion 33 is engaged with the top of the concave portion 10 and the second convex portion 34 abuts on the pivotal support portion 70 of the shock absorbing portion 7. Consequently, the swinging operation of the grip body 1 is controlled.

Accordingly, the grip body 1 and the cap 3 are held in an open state and the mounting portion 72 of the shock absorbing portion 7 is exposed. The assist grip according to the embodiment is supplied to an assembling step in this state.

At the assembling step, a worker simply inserts the bolt 6 through the exposed mounting portion 72, thereby carrying out fixation to the vehicle body steel plate 104. Therefore, there is not such a drawback that the grip body 1 and the cap 3 are obstacles. Accordingly, it is possible to fix the assist grip in a smaller man-hour than that in the first embodiment.

After the bolt 6 is fixed, the cap 3 is removed from the concave portion 10, of the grip body 1 and the projection 32 is engaged with the engagement hole 73 to cover the shock absorbing portion 7 as shown in FIG. 5. The grip body 1 is swung by the energizing force of the spring 12 and is held along the ceiling panel 105.

In the assist grip according to the second embodiment, when a great shock acts on the grip body 1, the shock absorbing portion 7 absorbs the shock by the buckling motion of the buckling portion 71. Accordingly, the shock to act on a human body can be relieved. Moreover, the central portion 75 is also formed of a plate metal. Accordingly, even if great force is applied to the central portion 75 when a curtain air bag 100 expands, the central portion 75 is simply deformed so that there is no such a drawback that fragments are scattered.

More specifically, according to the assist grip in accordance with the invention, the number of parts can be more reduced than that in the conventional art and the step of welding the shock absorbing member is not required. Therefore, it is possible to greatly reduce an assembly man-hour.

Third Embodiment

Another embodiment of the invention will be described below.

Figure 6:
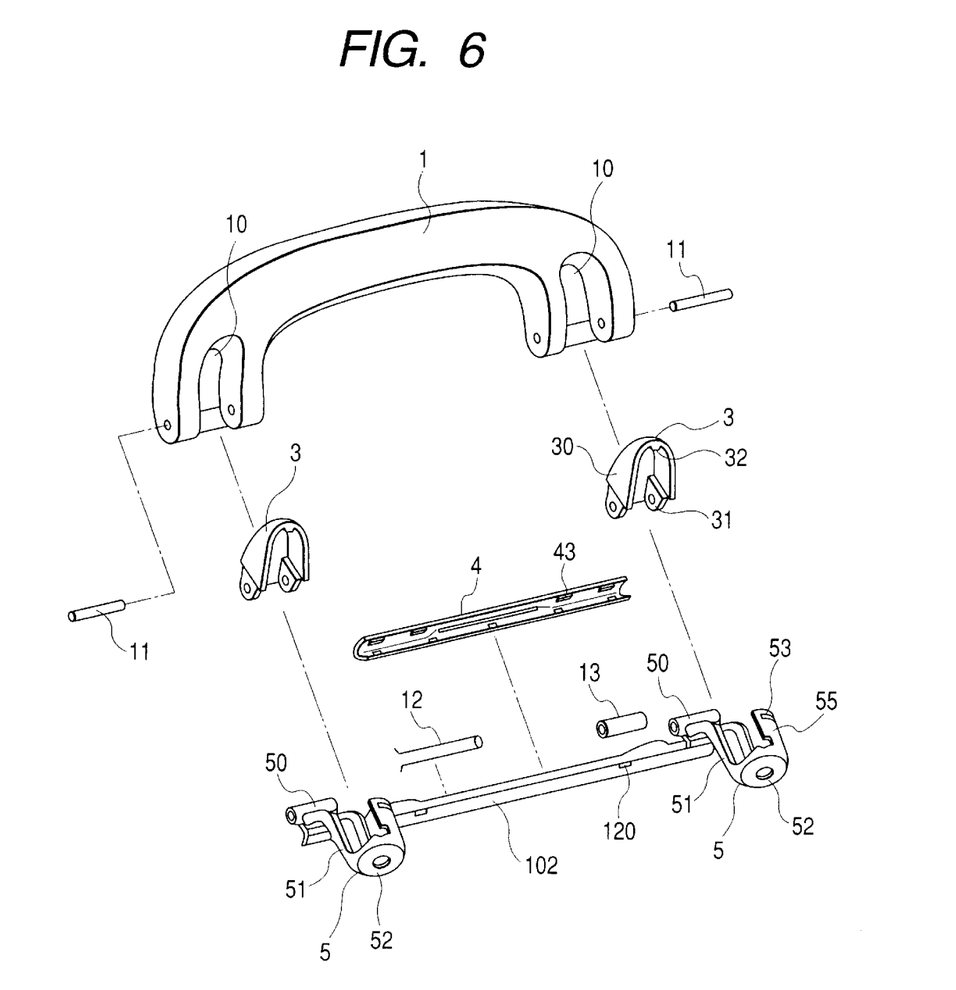
FIG. 6 is a perspective view showing the structure of a part of an assist grip according to a third embodiment of the invention.

An assist grip according to the third embodiment is mainly constituted by a grip body 1, a pair of mounting seats 5, a bridge portion 102, a pair of caps 3 and a cover 4 as shown in FIG. 6. Incidentally the mounting seat 5 in this embodiment corresponds to the shock absorbing portions 2, 7 in the first and second embodiments respectively.

The grip body 1 has a concave portion 10 provided on both ends, and the cap 3 and the mounting seat 5 provided on both ends of the bridge portion 102 are swingably supported in the concave portion 10 with a pin 11.

The bridge portion 102 is formed of a plate metal to have a U-shaped section and has the mounting seat 5 formed integrally on both ends thereof. The mounting seat 5 includes a pivotal support portion 50 through which the pin 11 is to be inserted, a buckling portion 51 protruded from the pivotal support portion 50 toward the opposite side and set to have a predetermined strength, a mounting portion 52 formed on the tip of the buckling portion 51 and provided with a bolt hole, and an engagement portion 55 having an engagement hole 53 which is protruded from the mounting portion 52 toward the pivotal support portion 50 side substantially in parallel with the buckling portion 51 and serves to engage one of ends of the cap 3.

In the mounting seat 5, the pivotal support portion 50 is swingably supported on the grip body 1 with the pin 11 and the mounting portion 52 is fixed to a vehicle body with a bolt. In the case in which a great shock acts on the grip body 1, the buckling portion 51 buckles to absorb the shock.

Figure 8:
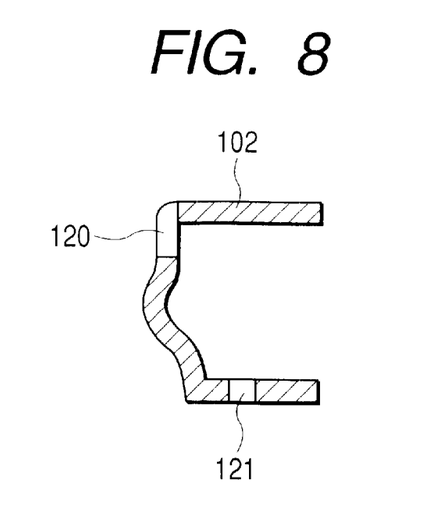
FIG. 8 is a sectional view showing a bridge portion of the assist grip according to the third embodiment of the invention.

As shown in FIG. 8, moreover, a plurality of first engagement holes 120 are provided on one of ends in a transverse direction of the bridge portion 102 at an interval in a longitudinal direction, and a plurality of second engagement holes 121 are provided on the other end at an interval in a longitudinal direction. A spring 12 is provided in the bridge portion 102 and energizes the grip body 1 and the bridge portion 102 in such a direction that they are separated from each other. Moreover, a damper 13 is coupled to one of the pins 11 in the bridge portion 102, thereby controlling the rotating speed of the bridge portion 102.

The cap 3 is formed of a synthetic resin and is constituted by a cover portion 30 for covering the mounting seat 5 and a pivotal support portion 31 extended from the cover portion 30 through which the pin 11 is to be inserted. A projection 32 to be engaged with the engagement hole 53 of the mounting seat 5 is protruded inwardly from the tip of the cover portion 30.

Figure 7:
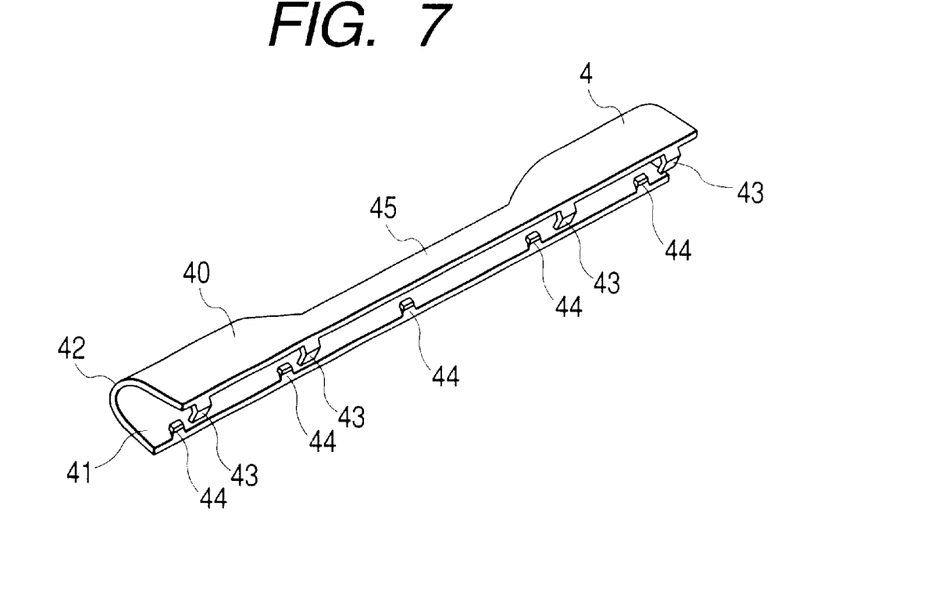
FIG. 7 is a perspective view showing a cover of the assist grip according to the third embodiment of the invention.

As shown in FIG. 7, the cover 4 has an U-shaped section including a first side surface portion 40 having a greater length on a section perpendicular to a longitudinal direction, a second side surface portion 41 which is opposed to the first side surface portion 40 at an interval and has a smaller length on a section than that of the first side surface portion 40, and a bottom portion 42 for coupling the first side surface portion 40 to the second side surface portion 41, and is formed of a soft synthetic resin.

A plurality of first claw portions 43 are provided in the first side surface portion 40 at an interval in a longitudinal direction and a plurality of second claw portions 44 are provided in the second side surface portion 41 at an interval in a longitudinal direction. The first claw portion 43 is inclined toward the bottom portion 42 at an acute angle with respect to a normal and has a greater length than that of the second claw portion 44. Moreover, the second claw portion 44 is also inclined toward the bottom portion 42 at an acute angle with respect to a normal and has a smaller length than that of the first claw portion 43. A small diameter portion 45 having a smaller whole length on a section perpendicular to a longitudinal direction than a whole length on sections of the first side surface portion 40, the bottom portion 42 and the second side surface portion 41.

Figure 9:
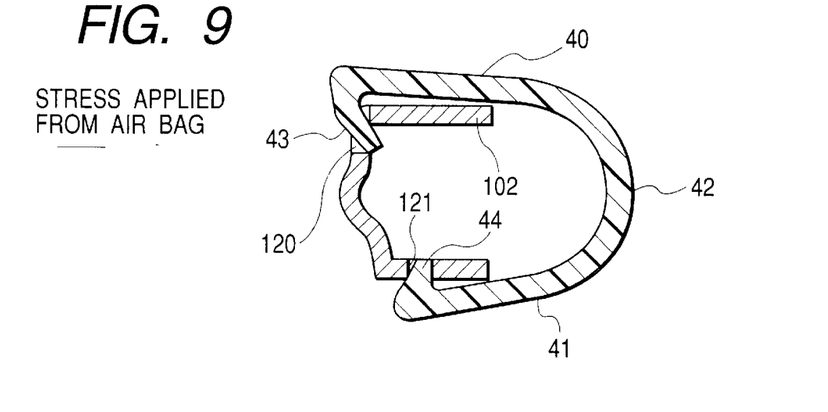
FIG. 9 is a sectional view showing a main part of the fixing structure of the cover and the bride portion in the assist grip according to the third embodiment of the invention.

As shown in FIG. 9, the cover 4 is fixed to the bridge portion 102 through the engagement of the first claw portion 43 with the first engagement hole 120 of the bridge portion 102 and the engagement of the second claw portion 44 with the second engagement hole 121.

Figure 10:
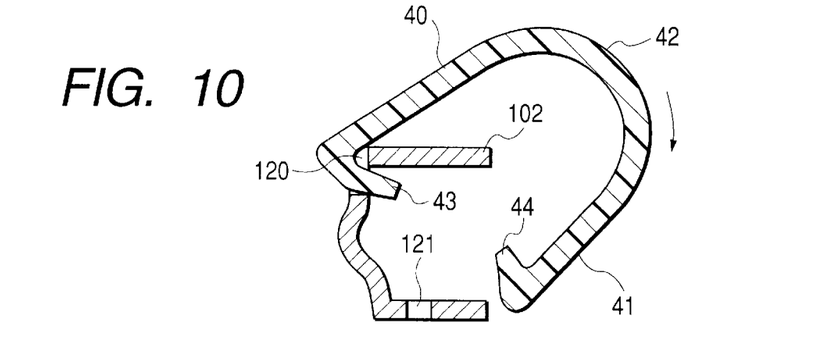
FIG. 10 is a sectional view showing a method of fixing the cover to the bridge portion in the assist grip according to the third embodiment of the invention.
Figure 11:
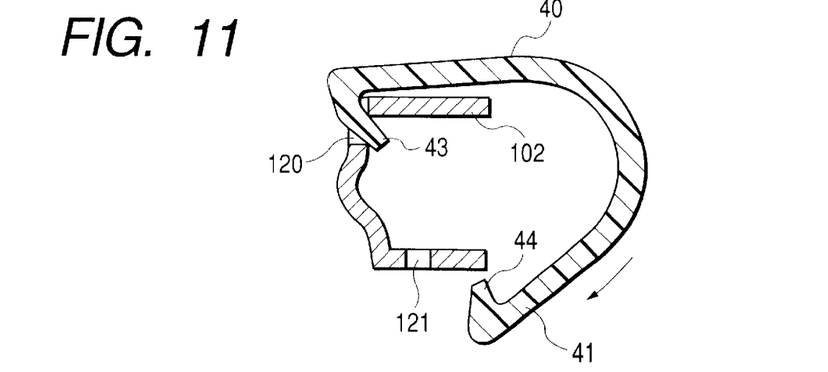
FIG. 11 is a sectional view showing the method of fixing the cover to the bridge portion in the assist grip according to the third embodiment of the invention.

In order to fix the cover 4 to the bridge portion 102, first of all, the first claw portion 43 is inserted in the first engagement hole 120 of the bridge portion 102 as shown in FIG. 10. Subsequently, the cover 4 is rotated in a direction of an arrow around the first claw portion 43. Since the second claw portion 44 interferes with the bridge portion 102 in that state, the first side surface portion 40 and the second side surface portion 41 are rotated with expansion in such a direction that they are separated from each other. At this time, the first side surface portion 40 has a sufficiently great length on the section perpendicular to the longitudinal direction. Therefore, the cover 4 is easily expanded in both end portions, and furthermore, the first claw portion 43 is also deformed. Consequently, the second claw portion 44 gets over the end of the bridge portion 102 as shown in FIG. 11. When the second claw portions 44 provided on both ends of the cover 4 get over the ends of the bridge portion 102, the second claw portions 44 of the small diameter portion 45 are correspondingly pulled to get over the ends of the bridge portion 102.

When the cover 4 is further rotated, the second claw portion 44 is engaged with the second engagement hole 121 so that the bridge portion 102 is completely covered with the cover 4 and the cover 4 is completely fixed to the bridge portion 102. In the assist grip according to the embodiment, thus, the cover can easily be fixed to the bridge portion 102.

More specifically, in the assist grip according to the embodiment, the bridge portion 102 formed of a metal is covered with the cover 4 formed of a synthetic resin. Therefore, it is possible to avoid such a drawback that the bridge portion 102 is exposed to deteriorate an appearance. When a stress is applied from the curtain shield air bag to the bridge portion 102 as shown in FIG. 9, the central part of the bridge portion 102 is flexed so that a part of the stress is absorbed because the bridge portion 102 has the shock absorbing portions 5 on both ends fixed to the vehicle body. Although the stress is also applied from the cover 4 to the air bag, it acts such that the first claw portion 43 and the second claw portion 44 are engaged with the first engagement hole 120 and the second engagement hole 121 more deeply. In addition, the small diameter portion 45 has a high rigidity and is deformed with difficulty. Therefore, there is not such a drawback that the cover 4 slips off from the bridge portion 102.

Since the cover 4 is firmly held in the bridge portion 102, there is not such a drawback that the cover 4 is broken by the stress applied from the air bag and fragments are thereby scattered.

More specifically, according to the assist grip in accordance with the third embodiment, even if a shock is applied from an air bag, a cover is not separated from a bridge portion and can easily be assembled into the bridge portion during assembly.

Although the above embodiments of the invention are described separately, these embodiments may be combined. For instance, the cover described in the third embodiment can be applied to the assist grip described as the second embodiment. Similarly, the cap described in the second embodiment can be applied to the assist grip described as the third embodiment.

What is claimed is:

1. An assist grip comprising:

a grip body; and a shock absorbing portion fixed to a vehicle body and including a pivotal support portion swingably supporting said grip body and a buckling portion extended from said pivotal support portion, wherein said shock absorbing portion is provided so as to be deformed by a shock, thereby absorbing the shock, and wherein said pivotal support portion and said buckling portion are integrally formed.

2. An assist grip comprising:

a grip body;

a shock absorbing portion fixed to a vehicle body and including a pivotal support portion swingably supporting said grip body and a buckling portion extended from said pivotal support portion;

a cap for covering said shock absorbing portion and swingably supported on said shock absorbing portion at a first end thereof; and an engagement portion provided at a second end of said cap;

wherein said shock aborbing portion is provided so as to be deformed by a shock, thereby absorbing the shock, wherein said engagement portion is engaged with said grip body by swinging said cap to thereby expose said shock absorbing portion, so that said engagement portion controls a swinging motion of said grip body in such a direction as to approach said shock absorbing portion.

3. An assist grip comprising:

a grip body;

a pair of mount seats swingably supporting both ends of said grip body;

a bridge portion formed of a metal coupling said mounting seats provided on both ends thereof; and a cover formed of a synthetic resin for covering said bridge portion, said cover including a first side surface portion, a second side surface portion opposed to said first side surface portion at an interval and having a smaller length on a section perpendicular to a longitudinal direction than that of said first side surface portion, and a bottom portion for coupling said first side surface portion to said second side surface portion, wherein a first claw portion and second claw portion are protruded inwardly from said first side surface portion and said second side surface portion respectively so as to be inclined toward said bottom portion at an acute angle with respect to a normal respectively, and said first and second claw portions are engaged with engagement holes provided in said bridge portion, so that said cover is fixed to said bridge portion such that an opening faces opposite to a vehicle compartment.

4. An assist grip according to claim 3, wherein said first claw portion has a greater length than that of said second claw portion.

5. An assist grip for an automobile according to claim 3, wherein a part of said cover is provided with a small diameter portion having a smaller whole length on a section perpendicular to a longitudinal direction than a whole length on sections of said first side surface portion, said bottom portion and said second side surface portion.

6. An assistant grip according to claim 3, wherein each of said mounting seats is fixed to a vehicle body and includes a pivotal support portion swingably supporting said grip body and a buckling portion extended from said pivotal support portion, and said mounting seat is provided so as to be deformed by a shock, thereby absorbing the shock.

7. An assist grip according to claim 3, further comprising:

a cap for covering one of said mounting seats and swingably supported on said mounting seat at an first end of each of said cap; and an engagement portion provided at a second end of said cap;

wherein said engagement portion is engaged with said grip body by swinging said cap to thereby expose said mounting seat, so that said engagement portion controls a swinging motion of said grip body in such a direction as to approach said shock absorbing portion.

* * * * *